(12) United States Patent
Kim

(10) Patent No.: US 12,003,162 B2
(45) Date of Patent: Jun. 4, 2024

(54) TERMINAL ASSEMBLY AND MOTOR INCLUDING THE SAME

(71) Applicant: HYUNDAI MOBIS CO., LTD., Seoul (KR)

(72) Inventor: Min Koo Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 203 days.

(21) Appl. No.: 17/382,824

(22) Filed: Jul. 22, 2021

(65) Prior Publication Data

US 2022/0029501 A1 Jan. 27, 2022

(30) Foreign Application Priority Data

Jul. 22, 2020 (KR) .................. 10-2020-0091214

(51) Int. Cl.
*H02K 3/52* (2006.01)
*H02K 5/22* (2006.01)

(52) U.S. Cl.
CPC ............. *H02K 5/225* (2013.01); *H02K 3/521* (2013.01); *H02K 2203/09* (2013.01)

(58) Field of Classification Search
CPC ............ H02K 3/50; H02K 3/505; H02K 3/52; H02K 3/521; H02K 3/522; H02K 5/22; H02K 5/225; H02K 2203/09
See application file for complete search history.

(56) References Cited

U.S. PATENT DOCUMENTS

| | | | |
|---|---|---|---|
| 2008/0150377 A1* | 6/2008 | Yamaguchi | H02K 3/522 310/43 |
| 2015/0295371 A1* | 10/2015 | Houzumi | B29C 45/1459 264/261 |
| 2016/0020660 A1* | 1/2016 | Houzumi | H02K 15/0062 310/71 |
| 2019/0157934 A1* | 5/2019 | Kawaguchi | H02K 3/50 |
| 2023/0047704 A1* | 2/2023 | Lee | H02K 3/522 |

* cited by examiner

*Primary Examiner* — Eric Johnson
(74) *Attorney, Agent, or Firm* — MORGAN, LEWIS & BOCKIUS LLP

(57) ABSTRACT

A terminal assembly includes: a body part; and a first bus bar and a second bus bar, each of which is at least partially inserted into the body part. A first end section of two opposing end sections of the first bus bar with respect to a radial direction (R) of the body part is inserted into the body part. A second end section of two opposing end sections of the second bus bar with respect to the radial direction (R) of the body part is inserted into the body part. A direction in which the first end section extends intersects with a direction in which the second end section extends.

17 Claims, 4 Drawing Sheets

TERMINAL ASSEMBLY AND MOTOR INCLUDING THE SAME

CROSS-REFERENCE TO RELATED APPLICATION(S)

This application claims priority from and the benefit of Korean Patent Application No. 10-2020-0091214, filed on Jul. 22, 2020, which is hereby incorporated by reference for all purposes as if set forth herein.

TECHNICAL FIELD

Exemplary embodiments relate to a terminal assembly and a motor including the terminal assembly.

BACKGROUND

Hairpin motors are required to be electrically connected to an external power supply so as to be driven. For this, a terminal assembly is provided on one side of a stator provided in such a hairpin motor, and the terminal assembly serves as a medium for electrical connection between the power source and the hairpin motor, particularly, the stator. That is, in order to mount the hairpin motor, not only a space to be occupied by a rotor and the stator constituting the hairpin motor but also a space to be occupied by the terminal assembly is required to be secured.

However, according to the related art, the terminal assembly occupies a large space, and thus the space in which the hairpin motor can be mounted has been significantly limited.

Also, according to the related art, due to inferior insulating properties between bus bars provided in the terminal assembly, safety of the hairpin motor when driven has been deteriorated.

SUMMARY

Exemplary embodiments of the present disclosure provide a terminal assembly which occupies a minimal space so as to minimize a space required to mount a hairpin motor.

Exemplary embodiments of the present disclosure further provide a terminal assembly which improves insulating properties between bus bars provided in the terminal assembly so as to enhance safety of a hairpin motor when driven.

According to a first exemplary embodiment of the present disclosure, a terminal assembly includes: a body part; and a first bus bar and a second bus bar, each of which is at least partially inserted into the body part. A first end section of two opposing end sections of the first bus bar with respect to a radial direction (R) of the body part is inserted into the body part, and a second end section of two opposing end sections of the second bus bar with respect to the radial direction (R) of the body part is inserted into the body part, wherein a direction in which the first end section extends intersects with a direction in which the second end section extends.

The direction in which the first end section extends may intersect perpendicularly with the direction in which the second end section extends.

A third end section which is disposed on an opposite side of the first end section between the two opposing the end sections of the first bus bar may extend in a direction parallel to the first end section. A fourth end section which is disposed on an opposite side of the second end section between the two opposing the end sections of the second bus bar may extend in a direction intersecting with the second end section.

A third end section which is disposed on an opposite side of the first end section between the two opposing the end sections of the first bus bar may extend in a direction parallel to a fourth end section which is disposed on an opposite side of the second end section between the two opposing the end sections of the second bus bar.

A recessed portion having a recessed shape may be formed in an area of the body part into which the first end section is inserted.

A through-hole may be formed in an area of the body part into which the second end section is inserted.

The terminal assembly may further include a first fixing part inserted into the recessed portion and configured to fix the first end section of the first bus bar.

The terminal assembly may further include a second fixing part inserted into the through-hole and configured to fix the second end section of the second bus bar.

The first fixing part may have a U shape surrounding the first end section.

The second fixing part may have a straight line shape.

Through-holes may be respectively formed in both side surfaces of the area of the body part into which the second end section is inserted, and the second fixing part may be inserted into each of the through-holes formed in the both side surfaces.

The recessed portion may be formed in one side surface of both side surfaces of the body part in a width direction (W) which is perpendicular to the radial direction (R) of the body part.

The through-holes may be formed in the both side surfaces of the body part in a width direction (W) which is perpendicular to the radial direction (R) of the body part.

The first end section may be disposed inwardly from the second end section in the radial direction (R) of the body part.

The recessed portion may be spaced apart from the through-hole in the radial direction (R) and a width direction (W) of the body part which is perpendicular to the radial direction (R) of the body part.

According to a second exemplary embodiment of the present disclosure, a motor includes: a rotor; a stator arranged on one side of the rotor; and a terminal assembly arranged on one side of the stator. The terminal assembly includes: a body part; and a first bus bar and a second bus bar, each of which is at least partially inserted into the body part, wherein a first end section of two opposing end sections of the first bus bar is inserted into the body part, and a second end section of two opposing end sections of the second bus bar is inserted into the body part, wherein a direction in which the first end section extends intersects with a direction in which the second end section extends.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a terminal assembly and a motor according to the present disclosure will be described with reference to the drawings.

Terminal Assembly

Figure 1:
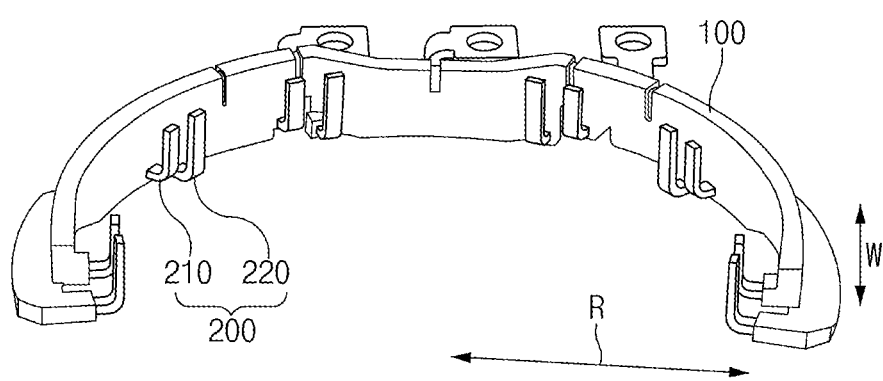
FIG. 1 is a perspective view illustrating a structure of a terminal assembly according to the present disclosure.
Figure 2:
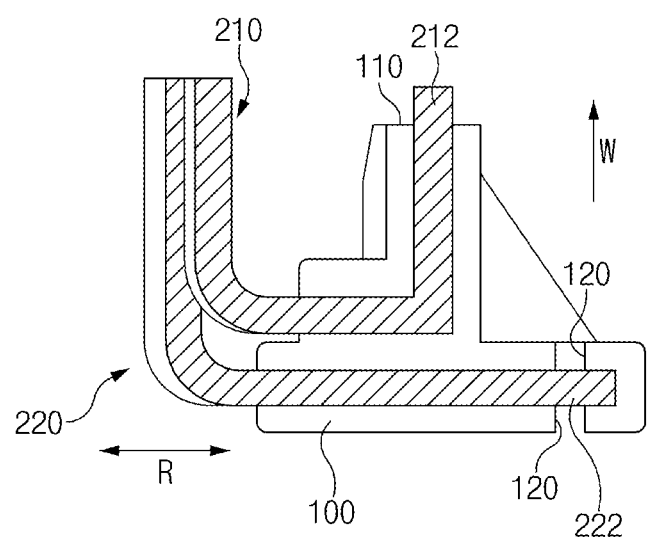
FIG. 2 is an enlarged cross-sectional view illustrating a coupled structure between a body part and bus bars provided in the terminal assembly according to the present disclosure.
Figure 3:
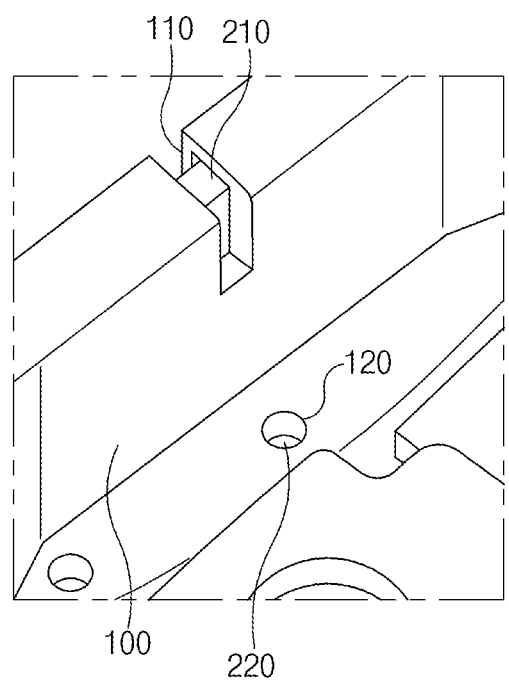
FIG. 3 is an enlarged perspective view illustrating a state in which the bus bars are exposed through a recessed portion and a hole formed in the body part of the terminal assembly according to the present disclosure.
Figure 4:
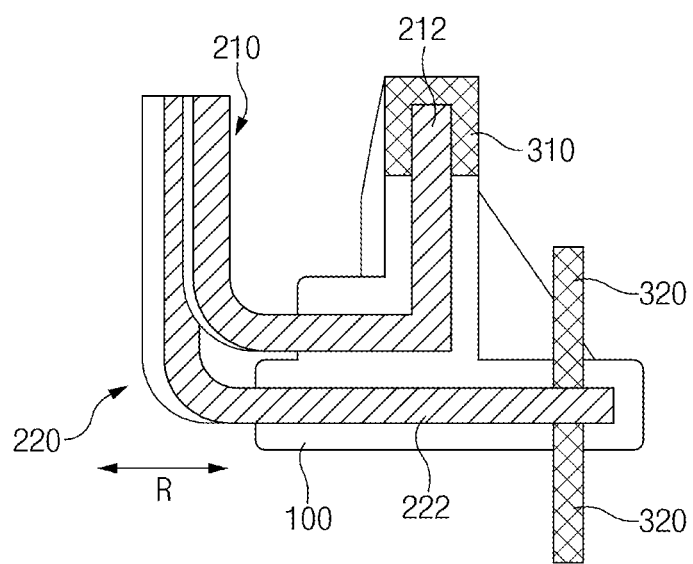
FIG. 4 is an enlarged cross-sectional view illustrating a coupled structure of fixing parts provided in the terminal assembly according to the present disclosure.

FIG. 1 is a perspective view illustrating a structure of a terminal assembly according to the present disclosure, and FIG. 2 is an enlarged cross-sectional view illustrating a coupled structure between a body part and bus bars provided in the terminal assembly according to the present disclosure. Also, FIG. 3 is an enlarged perspective view illustrating a state in which the bus bars are exposed through a recessed portion and a through-hole formed in the body part of the terminal assembly according to the present disclosure, and FIG. 4 is an enlarged cross-sectional view illustrating a coupled structure of fixing parts provided in the terminal assembly according to the present disclosure.

Here, the terminal assembly according to the present disclosure may be a component for electrically connecting a motor to an external power supply so as to drive the motor. More specifically, the terminal assembly according to the present disclosure may be provided in a hairpin motor.

As illustrated in FIG. 1, a terminal assembly 10 according to the present disclosure may include a body part 100 that forms a body of the terminal assembly 10. As illustrated in FIG. 1, the body part 100 may have an approximately partial circular shape, that is, an approximately arc shape. Thus, in the specification, when the body part 100 has an approximately arc shape in a horizontal direction, a radial direction R of the body part 100 is defined as a direction from the center of the arc toward the body part 100. Also, a width direction W of the body part 100 is defined as an up-down direction in which the body part 100 extends, that is, a direction perpendicular to the radial direction R.

Continuing to refer to FIG. 1, the terminal assembly 10 according to the present disclosure may include a bus bar 200 which is at least partially inserted into the body part 100. The bus bar 200 may include a first bus bar 210 and a second bus bar 220. FIG. 1 illustrates a state in which a portion of each of the first bus bar 210 and the second bus bar 220 is inserted into the body part 100 while the other portion is exposed to the outside.

Here, the bus bar 200 may include two end sections. More specifically, as illustrated in FIG. 2, among both end sections of the first bus bar 210 with respect to the radial direction R of the body part 100, one end section (hereinafter, referred to as a 'first end section 212') is inserted into the body part 100. Among both end sections of the second bus bar 220 with respect to the radial direction R of the body part 100, one end section (hereinafter, referred to as a 'second end section 222') is inserted into the body part 100. A direction in which the first end section 212 extends may not be parallel to but intersect with a direction in which the second end section 222 extends. More specifically, the direction in which the first end section 212 extends may intersect perpendicularly with the direction in which the second end section 222 extends. FIG. 2 illustrates a state in which the first end section 212 of the first bus bar 210 extends upward in the width direction W while the second end section 222 of the second bus bar 220 extends to the right in the radial direction R.

Also, according to the present disclosure, one end section which, between both the end sections of the first bus bar 210, is provided on the opposite side from the first end section 212 may be provided in a direction parallel to the first end section 212. One end section which, between both the end sections of the second bus bar 220, is provided on the opposite side from the second end section 222 may be provided in a direction intersecting perpendicularly with the second end section 222. Also, the one end section which, between both the end sections of the first bus bar 210, is provided on the opposite side from the first end section 212 may be provided in a direction parallel to the one end section which, between both the end sections of the second bus bar 220, is provided on the opposite side from the second end section 222.

According to the related art, all end sections which, between both end sections of bus bars, are inserted into a body part of a terminal assembly extend in a radial direction of the body part. Thus, the terminal assembly according to the related art may occupy a large volume in the radial direction, and this causes an increase in the size of the hairpin motor in the radial direction.

However, according to the present disclosure, the first end section 212 of the first bus bar 210 is provided in a direction intersecting with the second end section 222 of the second bus bar 220, and thus, the first end section 212 extends in the width direction W of the body part 100. Thus, the volume occupied by the first bus bar 210 in the radial direction R may be reduced, and thus, it is possible to minimize an increase in the size of the motor in the radial direction R of the body part 100.

Here, a recessed portion and a through-hole may be formed in the body part 100 so as to expose a portion of each of the first bus bar 210 and the second bus bar 220 to the outside. More specifically, referring to FIGS. 2 and 3, a recessed portion 110 having a recessed shape may be formed in an area of the body part 100 into which the first end section 212 of the first bus bar 210 is inserted, and a through-hole 120 may be formed in an area of the body part 100 into which the second end section 222 of the second bus bar 220 is inserted.

Also, referring to FIG. 4, the terminal assembly 10 according to the present disclosure may further include a fixing part 300 which is inserted into each of the recessed portion 110 and the through-hole 120. The fixing part 300 fixes the first end section 212 of the first bus bar 210 and the second end section 222 of the second bus bar 220 to the body part 100 and insulates the first end section 212 and the second end section 222 from the outside.

More specifically, the fixing part 300 may further include: a first fixing part 310 which is inserted into the recessed portion 110 and fixes the first end section 212 of the first bus bar 210; and a second fixing part 320 which is inserted into the through-hole 120 and fixes the second end section 222 of the second bus bar 220.

Here, the first fixing part 310 and the second fixing part 320 may have shapes corresponding to the recessed portion 110 and the through-hole 120, respectively. More specifically, the first fixing part 310 may have a U shape that surrounds the first end section 212 exposed to the outside, and the second fixing part 320 may have a straight line shape that seals, from the outside, the second end section 222 exposed to the outside.

Also, as illustrated in FIGS. 2 to 4, the through-hole 120 may be formed in each of both side surfaces (the top surface and bottom surface in FIGS. 2 to 4) of the area of the body part 100 into which the second end section 222 is inserted. More specifically, the through-holes 120 may be formed in both side surfaces (that is, the top surface and the bottom surface) of the body part 100 in the width direction. Here, the second fixing part 320 may also be inserted into each of the through-holes 120 formed in both the side surfaces. On the other hand, the recessed portion 110 may be formed only in one side surface of both side surfaces of the body part 100 in the width direction W. FIGS. 2 and 3 illustrate a state in which the recessed portion 110 is formed only in the top surface of the body part 100 in the width direction W. Here, the first fixing part 310 and the second fixing part 320 may be provided while pressing the first end section 212 and the second end section 222, respectively, so that the first bus bar 210 and the second bus bar 220 may be fixed within the body part 100.

According to the present disclosure, the first end section 212 extends in the width direction W of the body part 100, and the second end section 222 extends in the radial direction R of the body part 100. Thus, the distance between the first end section 212 and the second end section 222 becomes increased. Accordingly, the distance between the recessed portion 110 formed around the first end section 212 and the through-hole 120 formed around the second end section 222 also becomes increased. Thus, even if the first fixing part 310 and the second fixing part 320, which are inserted over the first end section 212 and the second end section 222, are separated from the recessed portion 110 and the through-hole 120, respectively, the safety of the motor when driven may be enhanced because the insinuating properties between the first bus bar 210 and the second bus bar 220 is improved.

Continuing to refer to FIG. 2, in order to minimize the volume of the terminal assembly 10 in the radial direction R, the first end section 212 of the terminal assembly 10 according to the present disclosure may be provided inward (left side in FIG. 2) from the second end section 222 in the radial direction R of the body part 100.

Also, as described above, the direction in which the first end section 212 extends may intersect with the direction in which the second end section 222 extends. Thus, according to the present disclosure, the recessed portion 110 may be spaced apart from the through-hole 120 in the radial direction R and the width direction W of the body part 100. FIG. 2 illustrates a state in which the through-hole 120 is spaced outward from the recessed portion 110 in the radial direction R, and the recessed portion 110 is spaced upward from the through-hole 120 in the width direction W.

Motor

The motor according to the present disclosure may be a hairpin motor. More specifically, the motor according to the present disclosure may include: a rotor; a stator provided on one side of the rotor; and a terminal assembly 10 provided on one side of the stator. Here, the terminal assembly 10 may include: a body part 100 that forms a body of the terminal assembly 10; and a first bus bar 210 and a second bus bar 220, each of which is at least partially inserted into the body part 100. Here, a first end section 212 between both end sections of the first bus bar 210 is inserted into the body part 100, and a second end section 222 between both end sections of the second bus bar 220 is inserted into the body part 100. A direction in which the first end section 212 extends may intersect with a direction in which the second end section 222 extends.

According to the present disclosure, the terminal assembly occupies the minimal space, and thus, the space required to mount the hairpin motor may be minimized.

Also, according to the present disclosure, the insulating properties between the bus bars provided in the terminal assembly is improved, and thus, the safety of the hairpin motor when driven may be enhanced.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A terminal assembly comprising:
a body part; and
a first bus bar and a second bus bar, each of which is at least partially inserted into the body part,
wherein a first end section of two opposing end sections of the first bus bar with respect to a radial direction (R) of the body part is inserted into the body part,
wherein a second end section of two opposing end sections of the second bus bar with respect to the radial direction (R) of the body part is inserted into the body part,
wherein a direction in which the first end section extends intersects with a direction in which the second end section extends,
wherein a radially outermost part of the first bus bar embedded in the body part extends in an axial direction (W) which is perpendicular to the radial direction (R), and a radially outermost part of the second bus bar embedded in the body part extends in the radial direction (R),
wherein a radially innermost part of the first bus bar embedded in the body part extends in the radial direction (R), and a radially innermost part of the second bus bar embedded in the body part extends in the radial direction (R).

2. The terminal assembly of claim 1, wherein the direction in which the first end section extends intersects perpendicularly with the direction in which the second end section extends.

3. The terminal assembly of claim 1, wherein a third end section which is disposed on an opposite side of the first end section between the two opposing end sections of the first bus bar extends in a direction parallel to the first end section,
wherein a fourth end section which is disposed on an opposite side of the second end section between the two opposing end sections of the second bus bar extends in a direction intersecting with the second end section.

4. The terminal assembly of claim 1, wherein a third end section which is disposed on an opposite side of the first end section between the two opposing end sections of the first bus bar extends in a direction parallel to a fourth end section which is disposed on an opposite side of the second end section between the two opposing end sections of the second bus bar.

5. The terminal assembly of claim 1, wherein a recessed portion having a recessed shape is formed in an area of the body part into which the first end section is inserted.

6. The terminal assembly of claim 5, wherein a through-hole is formed in an area of the body part into which the second end section is inserted.

7. The terminal assembly of claim 6, further comprising a second fixing part located in the through-hole and configured to press the second end section of the second bus bar such that the second bus bar is positioned within to the body part.

8. The terminal assembly of claim 7, wherein the second fixing part has a straight line shape.

9. The terminal assembly of claim 7, wherein the through-hole and an additional through-hole are formed in both side surfaces of the area of the body part into which the second end section is inserted, and
the second fixing part and an additional fixing part are located in the through-hole and the additional through-hole formed in the both side surfaces.

10. The terminal assembly of claim 9, wherein the through-hole and the additional through-hole are formed in the both side surfaces of the body part in the axial direction (W) which is perpendicular to the radial direction (R) of the body part.

11. The terminal assembly of claim 6, wherein the recessed portion is spaced apart from the through-hole in the radial direction (R) and the axial direction (W) of the body part which is perpendicular to the radial direction (R) of the body part.

12. The terminal assembly of claim 5, further comprising a first fixing part located in the recessed portion and configured to press the first end section of the first bus bar such that the first bus bar is positioned within the body part.

13. The terminal assembly of claim 12, wherein the first fixing part has a U shape surrounding the first end section.

14. The terminal assembly of claim 5, wherein the recessed portion is formed in one side surface of both side surfaces of the body part in the axial direction (W) which is perpendicular to the radial direction (R) of the body part.

15. The terminal assembly of claim 1, wherein the first end section is disposed inwardly from the second end section in the radial direction (R) of the body part.

16. A motor comprising:
a rotor;
a stator arranged on one side of the rotor; and
a terminal assembly arranged on one side of the stator, wherein the terminal assembly comprises:
a body part; and
a first bus bar and a second bus bar, each of which is at least partially inserted into the body part,
wherein a first end section of two opposing end sections of the first bus bar is inserted into the body part,
wherein a second end section of two opposing end sections of the second bus bar is inserted into the body part,
wherein a direction in which the first end section extends intersects with a direction in which the second end section extends,
wherein a radially outermost part of the first bus bar embedded in the body part extends in an axial direction (W) which is perpendicular to the radial direction (R), and a radially outermost part of the second bus bar embedded in the body part extends in the radial direction (R),
wherein a radially innermost part of the first bus bar embedded in the body part extends in the radial direction (R), and a radially innermost part of the second bus bar embedded in the body part extends in the radial direction (R).

17. A terminal assembly comprising:
a body part; and
a first bus bar and a second bus bar, each of which is at least partially inserted into the body part,
wherein a first end section of two opposing end sections of the first bus bar with respect to a radial direction (R) of the body part is inserted into the body part,
wherein a second end section of two opposing end sections of the second bus bar with respect to the radial direction (R) of the body part is inserted into the body part,
wherein a direction in which the first end section extends intersects with a direction in which the second end section extends,
wherein a radially outermost part of the first bus bar embedded in the body part extends in an axial direction (W) which is perpendicular to the radial direction (R), and a radially outermost part of the second bus bar embedded in the body part extends in the radial direction (R), and
wherein a third end section which is disposed on an opposite side of the first end section between the two opposing end sections of the first bus bar extends in a direction parallel to the first end section, the first and third end sections extending towards the same direction as each other between two opposite directions of the axial direction (W).

* * * * *